(12) United States Patent
Vinje

(10) Patent No.: US 6,832,160 B2
(45) Date of Patent: Dec. 14, 2004

(54) METHOD FOR FINDING REFLECTIVITY OF REFLECTORS

(75) Inventor: Vetle Vinje, Oslo (NO)

(73) Assignee: Norsar (NO)

( * ) Notice: Subject to any disclaimer, the term of this patent is extended or adjusted under 35 U.S.C. 154(b) by 0 days.

(21) Appl. No.: 09/863,861

(22) Filed: May 23, 2001

(65) Prior Publication Data

US 2002/0010549 A1 Jan. 24, 2002

(30) Foreign Application Priority Data

May 26, 2000 (NO) .......................................... 20002712

(51) Int. Cl.$^7$ .............................. G01V 1/28; G01V 1/00
(52) U.S. Cl. .......................................... 702/14; 367/73
(58) Field of Search .............................. 702/14, 18, 11, 702/16; 181/108; 367/73; 703/2, 5

(56) References Cited

U.S. PATENT DOCUMENTS 6,094,621 A * 7/2000 Hanitzsch et al. ............ 702/16

OTHER PUBLICATIONS

"Multiple Weights in Diffraction Stack Migration", Tygel et al., Geophysics, vol. 59, No. 12, pp. 1820–1830, Dec. 1993.*

"Angle–Dependent Reflectivity by Means of Prestack Migration", de Bruin et al., Geophysics, vol. 5, No. 9, pp. 1223–1234, Sep. 1990.*

"3–D True–Amplitude Finite–Offset Migration", Schleicher et al., Geophysics, vol. 58, No. 8, Aug. 1993, pp. 1112–1126.*

* cited by examiner

*Primary Examiner*—John Barlow
*Assistant Examiner*—Toan M. Le
(74) *Attorney, Agent, or Firm*—Rodman & Rodman

(57) ABSTRACT

Method for solving the classical inversion problem of finding the angle dependent reflection coefficients along selected reflectors in the subsurface. The input data to the method include seismic constant offset or constant angle data cubes from Pre-Stack Depth Migration of Kirchhoff type and the corresponding reflectors and velocities from the interpretation and velocity analysis of the data. One or more of the reflectors are chosen and ray modeling is done to create synthetic seismics for all shot/receiver pairs in the seismic survey. Based on these modeling results, amplitude correction maps are made for the various reflection angles. These correction maps are applied to the amplitudes from the seismic data. The corrected amplitudes are approximations to the angle-dependent reflection coefficients in all points on each selected reflector. For each point, a weight function is computed, giving the quantitative resolution of the estimate of the reflection coefficient.

19 Claims, 6 Drawing Sheets

US 6,832,160 B2

METHOD FOR FINDING REFLECTIVITY OF REFLECTORS

INTRODUCTION

The ultimate goal of seismics is to find the physical properties of the subsurface. Seismic energy in the form of compressional or shear waves are transmitted into the ground and the reflections (echoes) from structures in the subsurface are recorded by sensors (hydrophones or geophones) most commonly located at, or near the surface of the earth.

The wave field recorded by the sensors is then processed in computers. The resulting "sound images" of the subsurface are interpreted by geophysicists and geologists to make maps of the structures. These structures are mainly represented by interfaces separating layers with different physical properties. These interfaces are detectable only because they are capable of reflecting seismic energy.

This patent application describes a new method that estimates the reflectivity, expressed by the angle-dependant reflection coefficient, from seismic measurements.

There is a comprehensive literature on methods for estimating the reflectivity of reflectors in the subsurface. Such methods are often called "True Amplitude Migration (TAM)" methods. Within the scope of this patent application it is not possible to give a full review of all methods published, but a common feature of the existing methods is that they estimate both the spatial position and its reflectivity in one operation.

A review and comparison between several existing methods is found in [1] in the list of references. Important publications within TAM are [2], [3], [4], [5], [6] and [7].

FIGURE CAPTIONS

Figure 1:
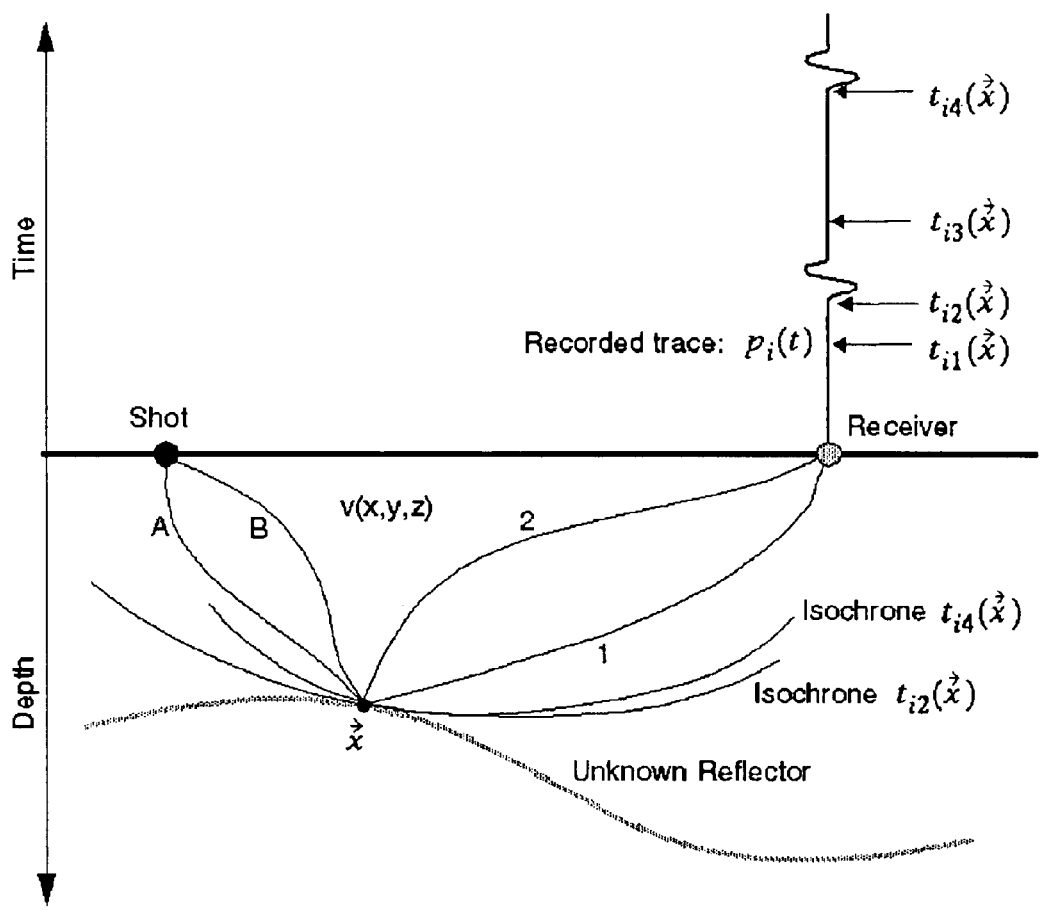

The characteristics of the invention described of this patent application are explained with the aid of a series of figures where:

FIG. 1: In Kirchhoff pre stack depth migration, the recorded trace for shot/receiver pair #i is stacked into position $\vec{x}$ in depth. In this case there are 4 ray paths that are candidates to a reflected pulse in the receiver, The ray paths are A-1 (ray A from Shot to position $\vec{x}$ and ray 2 from $\vec{x}$ to Receiver), and correspondingly, A-2, B-1 and B-2. Usually, only one of these ray paths will be used in the migration. On the figure, the isochrones (i.e. surfaces of constant traveltime between Shot-isochrone-Receiver) corresponding to two of the 4 possible ray paths are shown. The points where these isochrones are tangent to the (unknown) reflectors, will be reflection points of the rays from shot to receiver. In this case, there are two rays with traveltimes $t_{i2}$ ($\vec{x}$) and $t_{i4}$ ($\vec{x}$) that reflects in depth point $\vec{x}$.

Figure 2:
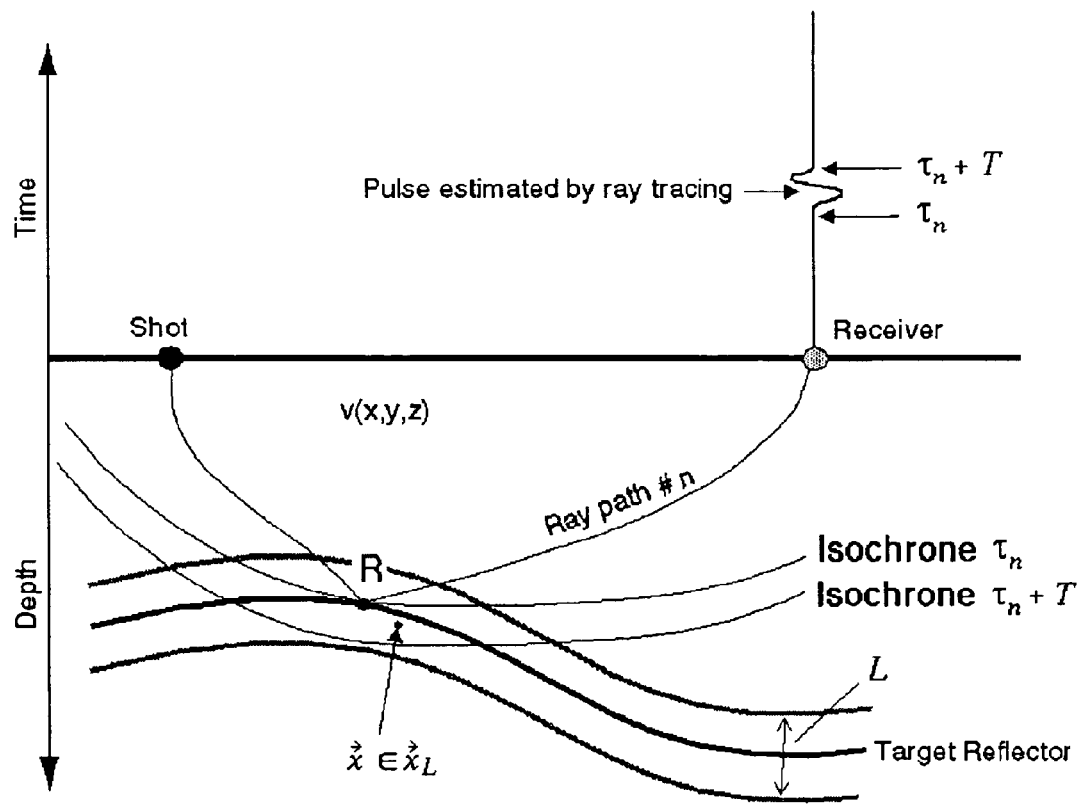

FIG. 2: In Kirchhoff prestack depth migration, the reflected pulse for shot/receiver pair (#i) is stacked in all points in-between the two isochrones $\tau_n$ and $\tau_n+T$ in depth. Along a band of width L at the reflector, there will be constructive interference between all the N pulses that are stacked to depth. If we call the set of depth points within this band $\vec{x}_L$, it is necessary to stack only the points in-between the two isochrones for which $\vec{x}=\vec{x}_L$.

Figure 3:
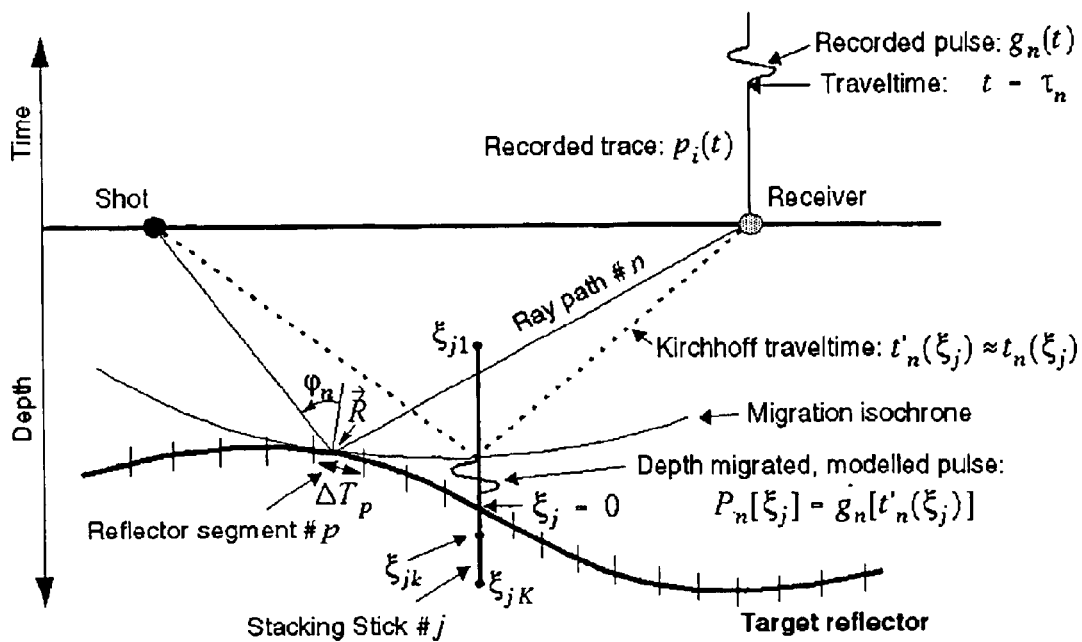

FIG. 3: The modelled pulse #n for shot/receiver pair #i is stacked in stacking stick #j. A stacking stick is a curve parametrized by $\xi_j$ and crossing the reflector with parametric value $\xi_j=0$. $\xi_{jk}$ is a discrete value of $\xi_j$ along the stacking stick. Only one stacking stick is shown in full length. The others are indicated as short vertical tics along target reflector. The stacking sticks are located at the boundaries of the reflector segments of area $\Delta T_p$.

Figure 4:
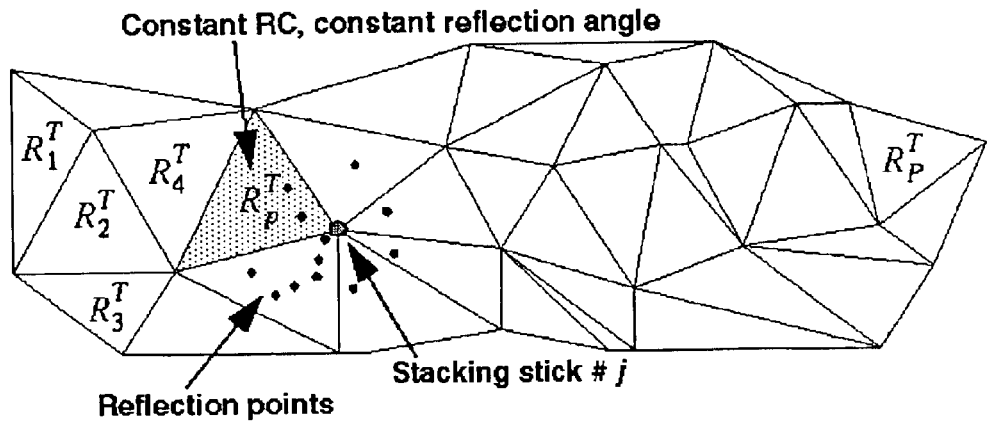

FIG. 4: Target reflector (in birds eye perspective) is parametrized by a triangular network. The Reflection Coefficient (RC) in stacking stick #j are found from rays with reflection points marked by black dots. The RC on the target reflector is parameterized by constant RC, $R_p^T$, in each of the P triangles of the network.

Figure 5:
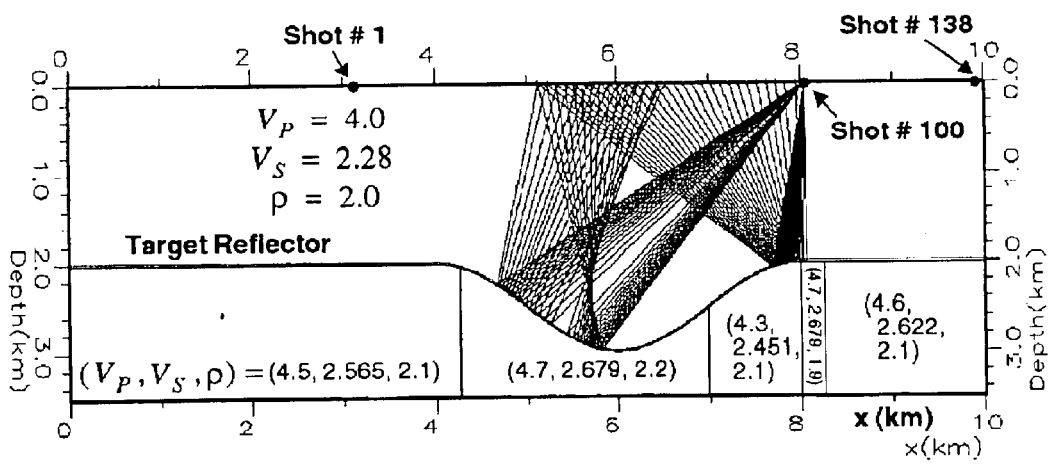

FIG. 5: A two-layer model with a syncline in the interface between x=4 km and x=8 km. In the upper layer, the seismic velocity of the P-waves (i.e. compressional waves) is 4.0 km/s, the velocity of the S-waves (i.e. the share waves) is 2.28 km/s and the density is 2.0 g/cm³. In the lowermost layer, the velocity and density is specified in the figure. The rays from shot #100 to the receivers are also shown.

Figure 6:
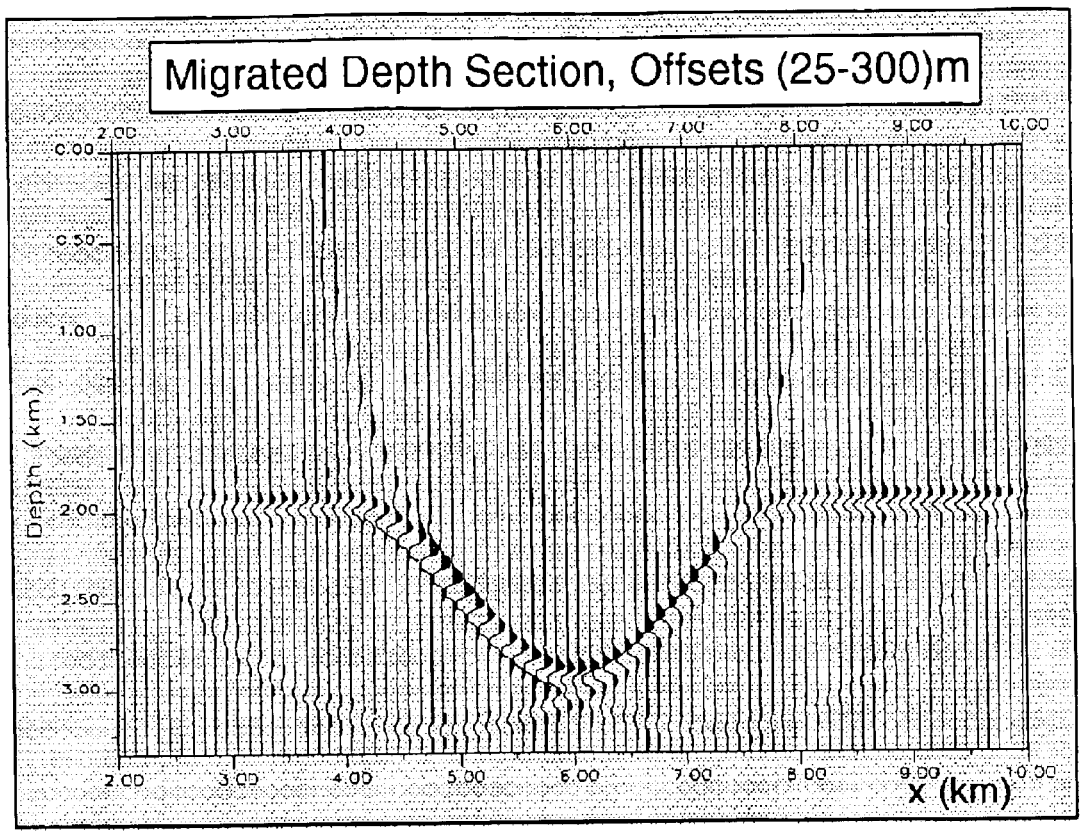

FIG. 6: A seismic depth section from PSDM of the lowest offset interval (shot/receiver distance from 25 m to 300 m) using the seismic data generated in the model shown in FIG. 5.

Figure 7:
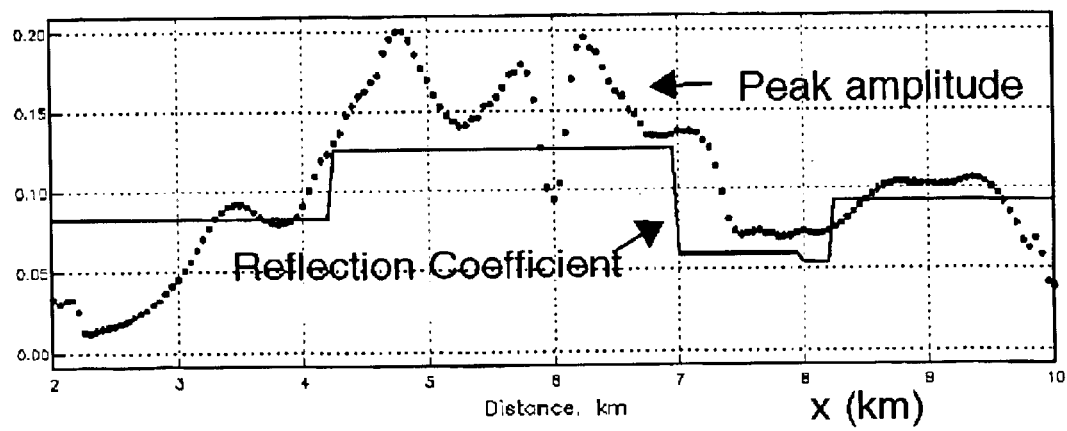

FIG. 7: Maximum amplitude (i.e. peak amplitude) along target reflector in the seismic depth section in FIG. 6 superimposed on the real reflection coefficient.

Figure 8:
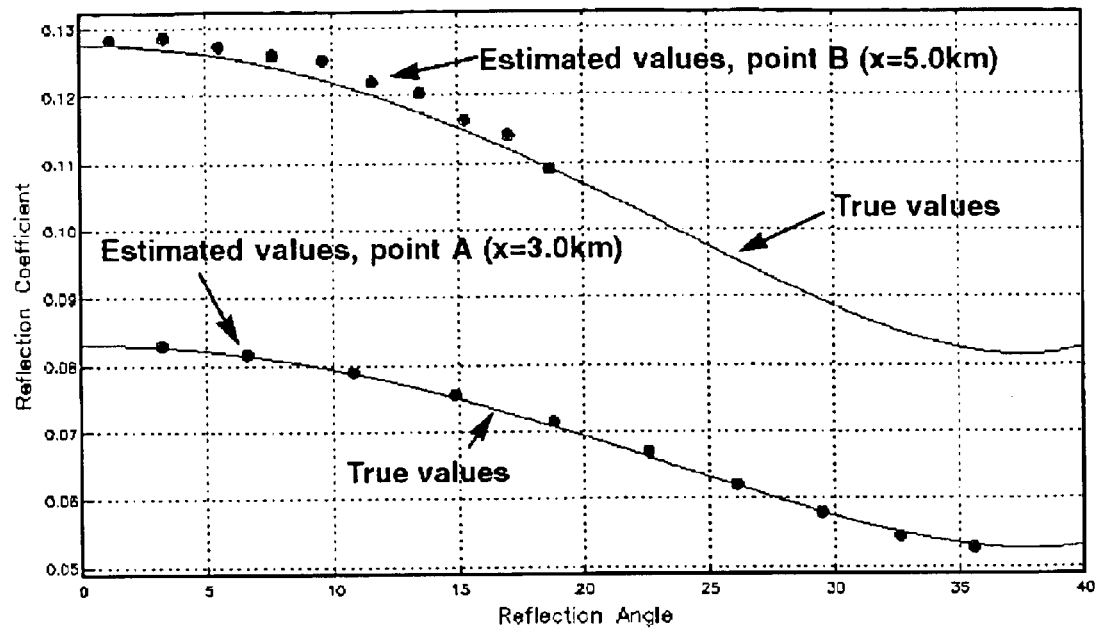

FIG. 8: Real and estimated (by ROAR) angle dependant reflection coefficient in position A (x=3 km) and B (x=5 km) in the model.

Figure 9:
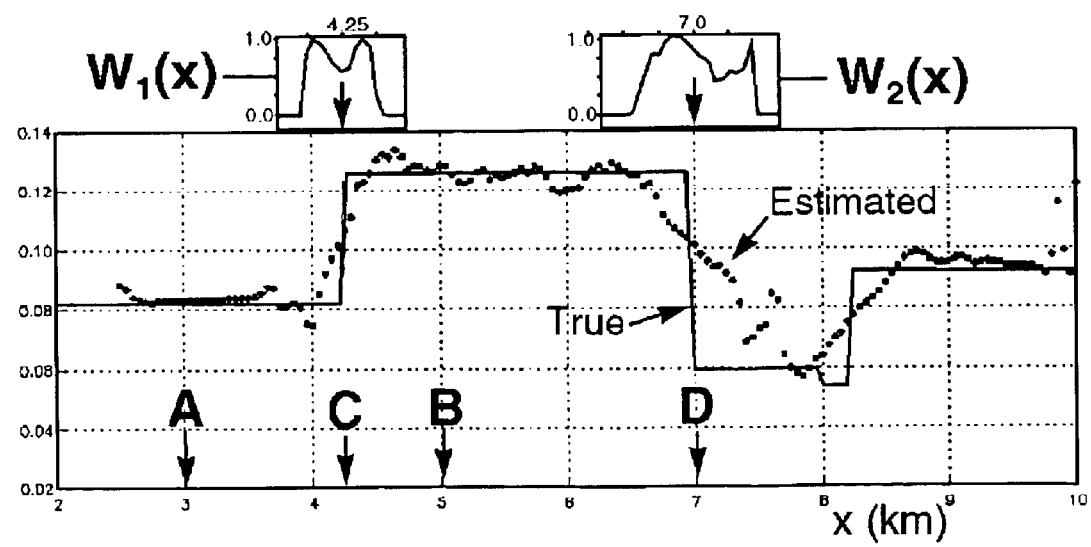

FIG. 9: Real and estimated (by ROAR) angle dependant RC for reflection angle close to 0 degrees along target reflector in the model in FIG. 5. Two of the weight functions ($W_1$ and $W_2$) giving the resolution in the estimated RC at point C and D are shown at the top of the figure.

PRE STACK DEPTH MIGRATION (PSDM)

In order to describe the new method of this patent application, we start with a description of Kirchhoff pre stack depth migration (references [5], [6], [7]), often abbreviated to PSDM (Pre Stack Depth Migration). Consider FIG. 1 showing an unknown reflector, a generally variable velocity field v(x,y,z) and a shot/receiver pair with a corresponding recorded time trace. A seismic survey often consists of millions of shot/receiver pairs. Note that we consider a 3-dimensional (3-D) volume even though the illustrations are shown in 2-D for simplicity. We now assume that PSDM is used to move (i.e. to migrate) the recorded data from the receivers at the surface down to a general position $\vec{x}$ in the subsurface. Such a depth migration is generally described by the equation $$P_{Obs}(\vec{x}) = \sum_{i=1}^{I} \sum_{j=1}^{J(i)} w_{ij}[\vec{x}] \cdot p_i[t_{ij}(\vec{x})] \qquad (1)$$

where I is the number of traces that are stacked in a general position $\vec{x}$ in the subsurface, $t_{ij}(\vec{x})$ is traveltime #j of the J(i) possible ray paths from the shot via $\vec{x}$ to the receiver for shot/receiver pair #i $\dot{p}_i[t_{ij}(\vec{x})]$ is the time derivative of the i'th time trace evaluated in time $t_{ij}(\vec{x})$, and $w_{ij}[\vec{x}]$ is the weight on the trace value $\dot{p}_i[t_{ij}(\vec{x})]$.

The unknown quantities at the right of equation 1, $t_{ij}(\vec{x})$, J(i) and $w_{ij}[\vec{x}]$ are generally computed by ray modeling (as described in references [8], [9], [10]), or by finite difference solution of the Eikonal equation as described in references [13] and [14].

When a large number of traces are stacked as described in equation 1, the reflected pulses from the unknown reflector is migrated into depth along isochrones (i.e. surfaces of constant traveltime shot-isochrone-receiver) that are tangential to the unknown reflector. This will lead to constructive interference along the reflector and destructive interference away from the reflector. Hence the migrated seismic cube, $P_{Obs}(\vec{x})$, shows higher amplitudes on and near the reflector so that the position of the reflector may be determined.

In the development of TAM within PSDM, great effort has been spent in deriving formulas for calculating weights $w_{ij}[\vec{x}]$ giving amplitudes in $P_{Obs}(\vec{x})$ that are proportional with the Reflection Coefficient (RC) along the reflectors in the depth model (see references [2], [5], [6] and [7]). The definition of the reflection coefficient as described in reference [11] is the ratio between the amplitude of an incidence plane wave field and its reflected plane wave field from a plane reflector.

In addition, there has been done much work in finding which of the J(i) possible ray paths from shot via the depth point $\vec{x}$ to the receiver that gives the best result in the migration. An accepted criterion for finding this "best" ray path is to use the ray from shot/receiver pair to $\vec{x}$ having the highest amplitude as described in reference [12]. Lately, also the rays with the shortest ray path have been used with good results. By selecting only one of the J(i) possible ray paths between shot-x-receiver, equation 1 may be simplified to $$P_{Obs}(\vec{x}) = \sum_{i=1}^{I} w_i[\vec{x}] \cdot \dot{p}_i[t_i(\vec{x})] \quad (2)$$

where $t_i(\vec{x})$ is the traveltime of the selected ray path from shot via $\vec{x}$ to the receiver for shot/receiver pair #i, $\dot{p}_i[t_i(\vec{x})]$ is the time derivative of the i'th trace $p_i[t]$ for traveltime $t=t_i(\vec{x})$, and $w_i[\vec{x}]$ is the weight on the trace value $\dot{p}_i[t_i(\vec{x})]$.

In the description of the new method below we assume constant, unit weights, i.e. that $w_i[\vec{x}]$ is 1.0 for all $\vec{x}$ and i.

DESCRIPTION OF THE NEW METHOD

The method described in this patent application is called "Reflector Oriented Amplitude Correction", abbreviated to ROAR.

Essence of ROAR

The starting point (what is assumed known) is:

A seismic survey, i.e. the positions of all shots and receivers in a seismic acquisition.

Characteristic properties of shot and receivers such as source pulse, directionality, and filter properties.

Pre-stack depth migrated constant-offset or constant-angle seismic data cubes.

Position and shape of the "target reflector" for which the reflection coefficient is to be estimated.

Model parameters (i.e. seismic velocities, densities, anelastic damping factors, interfaces etc.) of the part of the model lying above the target reflector.

The results are:

Discrete estimates of the angle dependant reflection coefficient for all illuminated areas of the target reflector. (equation 25 and 31).

A weight function (equation 47) for all discrete estimates of the reflection coefficient along the target reflector.

The advantages are:

Explicit use of the reflector so that better estimates of RC may be achieved.

Discrete estimates of RC for all illuminated areas of the surface with associated reflection angles.

A weight function for all estimates of RC giving the resolution of the estimates along the target horizon.

The possibility of finding the RC in models with acoustic as well as elastic materials.

The possibilities of including different wave modes to estimate the RC's for PP-, PS-, SP- and SS-reflections.

The possibility of using multiples for estimating the RC's along the target horizon.

A better treatment of the limited extension of the seismic survey and holes and missing traces in the data.

A possibility to improve the estimate of the RC's by including more complete ray modeling based on e.g. anisotropic ray theory and/or anelastic damping.

A reduced computation time and less use of disc space.

As mentioned above, most of the existing TAM methods try to solve the problem by finding both the reflector position and its reflection coefficient (RC) in one single process by using PSDM with weights on the trace samples that are migrated to depth. As opposed to this, ROAR estimates the reflector position and its RC in a process consisting of five steps. Steps 1, 2 and 3 are known techniques, while steps 4 and 5 are the essence of the invention:

Step 1: The recorded traces are migrated by PSDM by equation 1. When ROAR is to be used, it is an advantage, but not a necessity, to use the simplest and fastest version of PSDM with unit weights (i.e. with weights=1.0). The result of this process is a depth migrated seismic cube, $P_{Obs}(\vec{x})$.

Step 2: $P_{Obs}(\vec{x})$ is interpreted so that the spatial positions of the reflectors in the subsurface are found. Based on these reflectors and the seismic velocities (the velocities used in the PSDM in step 1) a depth model is constructed in the computer. One of the surfaces in the model is chosen as a target reflector.

Step 3: By modeling based on ray tracing, the reflected pulses from the target reflector for all shot/receiver pairs are estimated. Since we simulate the seismics in a depth model in the computer, we are free to select any value of the RC at the target reflector. In ROAR we are setting the RC to 1.0 for all reflection points and for all reflection angles along the target reflector. This means that all energy will be reflected from the target reflector.

Step 4: By doing a local PSDM on the synthetic, ray-tracing based traces from step 3 in a band around the target reflector, we will get a modeled, synthetic PSDM result, $P_{Mod}(\vec{x})$, locally around target reflector. The weight (see equation 1) used in this local PSDM must be identical to the weight used in the "real" PSDM in step 1.

Step 5: Measurements of the amplitudes along the target reflector from the real, depth migrated cube $P_{Obs}(\vec{x})$ is divided by corresponding measurements from the modeled PSDM, $P_{Mod}(\vec{x})$. The amplitude measurements may e.g. be done by the "square" method (equations 26 and 27), or by the "norm" method (equations 32 and 33)" It can be shown that the result is an estimate of the angle dependent RC. This is repeated for points along the entire target reflector so that a map of the RC with corresponding angles may be made.

In the detailed description of the ROAR method below, equation 16 presents a mathematical expression for PSDM of observed seismics, i.e. for the depth migrated seismic cube, $P_{Obs}(\vec{x})$. The corresponding expression for PSDM of the modeled seismic, $P_{Mod}(\vec{x})$, is presented in equation 22. In the following chapters, two slightly different ways for finding the angle dependent RC are described along with the formulas for finding the corresponding resolution function and reflection angle.

Expression for PSDM of Observed Seismics

We will now find an alternative equation for $P_{Obs}(\vec{x})$, the result from PSDM from equation 2 valid in the area around a selected target horizon in the depth model. The equation will express $P_{Obs}(\vec{x})$ as a sum of ray theoretical components.

Assume that $P_{Obs}(\vec{x})$ is found for all $\vec{x}$ using equation 2 for a certain offset interval, i.e. for a specific selection of shot/receiver pairs in the summation in equation 2. $P_{Obs}(\vec{x})$ will then be a constant offset seismic cube. The seismic cube is then interpreted so that explicit reflectors are found and put into the model. One of these reflectors is chosen as a target reflector.

Definition: A reflector for which the reflection coefficient is to be estimated is called a target reflector.

It is assumed that ray modeling (see references [8], [9], [10]) in a depth model that includes the target reflector may be used to estimate the traces, $p_i[t_i(\vec{x})]$, in equation 2. By ray modeling it is possible to estimate the pulse $g_k[t]$ at the receiver corresponding to ray #k reflected from the target horizon by the following equation:

$$g_k[t] = Re\{R_k Q_k\} s(t-\tau_k) - Im\{R_k Q_k\} h(t-\tau_k) \quad (3)$$

where $\tau_k$ is the traveltime of the ray,
s(t) and h(t) are the source pulse and its Hilbert transform, $$\begin{matrix} s(t) \\ h(t) \end{matrix} \Big\} \begin{matrix} \neq 0 & t \in [0, T] \\ = 0 & t \notin [0, T], \end{matrix}$$

where T is the duration of the source pulse,
$R_k = R_k(\phi_k)$ is the unknown, complex, angle dependent RC for the ray in reflection point $\vec{R}$ on the target reflector for reflection angle $\phi_k$ (see FIG. 3),
and $Q_k$ is a complex number giving the combined effect of geometrical spreading, transmission and/or reflection loss by other reflectors (than target reflector), phase shift caused by focal points (also called caustics) and anelastic damping.

Ray modeling may compute many parameters along the ray path. In addition to the reflection point $\vec{R}$, the parameters:

ray tangent vector for the incidence ray in $\vec{R}$,
ray tangent vector for the departing ray from $\vec{R}$,
ray tangent vector for the departing ray from the shot point,
ray tangent vector for the incidence ray to the receiver point and more may be computed. The use of these parameters will be discussed below.

As mentioned above, each of the I traces that are added into the depth point $\vec{x}$ in equation 2 may be estimated by ray modeling $$\dot{p}_i[t_i(\vec{x})] = \sum_{k=1}^{P(i)} \dot{g}_k[t_i(\vec{x})] \quad (4)$$

where P(i) is the number of rays between shot/receiver number i.

We then insert equation 4 into equation 2 and assume that the weight $w_i[\vec{x}]$ is 1.0 and we get $$P_{Obs}[\vec{x}] = \sum_{i=1}^{I} \sum_{k=1}^{P(i)} \dot{g}_k[t_i(\vec{x})] \quad (5)$$

We know that there has been a constructive interference between the migrated pulses along the target reflector. Therefore it is not necessary to stack traces for values of $\vec{x}$ that are outside a certain distance from target reflector. This will reduce the number of pulses $g_k$ that needs to be stacked in equation 5 since the pulses have a limited duration. Assuming that $\vec{x}$ lies within a band centered at the target reflector as shown in FIG. 2, equation 5 may be expressed as $$P_{Obs}[\vec{x}] = \sum_{n=1}^{N} \dot{g}_n[t_n(\vec{x})] \quad \vec{x} \in \vec{x}_L \quad (6)$$

where $\vec{x}_L$ is the set of all positions within the band around target reflector and N is the number of ray-based pulses $g_n$ in equation 5 characterized by the following property:

$$\tau_n < \tau_n(\vec{x}) > \tau_n + T \quad \vec{x} \in \vec{x}_L \quad (7)$$

where T is the duration the pulse, as shown in FIG. 2. The pulse corresponding to the ray path between the shot/receiver pair in FIG. 2 is mapped into point $\vec{x}$ since $\vec{x}$ is within the band around the reflector, i.e. $\vec{x} \in \vec{x}_L$.

We introduce a new definition, a Stacking Stick.

Definition: A Stacking Stick is a curve with a certain length $L_\xi$ crossing target reflector as illustrated in FIG. 3 where stacking stick #j is shown in full length. The length $L_\xi$ gives the width of the band around target reflector. $L_\xi$ is chosen so large that it covers a few dominant wavelengths of $P_{Obs}(\vec{x})$ around target reflector. A stacking stick is parameterized by $\vec{x}_j(\xi_j)$ giving the spatial position. The argument $\xi_j$ starts with the value $\xi_j = \xi_{jA}$ in one end of the stacking stick, passes $\xi_j=0$ at the intersection between the stacking stick and target horizon and ends in $\xi_j=\xi_{jB}$ in the other end of the stacking stick.

In FIG. 3 the stacking sticks are shown as vertical line segments crossing the Target Reflector, but the stacking sticks may also be chosen perpendicular to the target reflector. $P_{Obs}(\vec{x})$ is usually sampled on a regular, 3-dimensional Cartesian network (also called a seismic cube) with the discrete spatial positions given by $$\vec{x}_{ijk}=\vec{x}_0+((i-1)dx,(j-1)dy,(k-1)dz) \qquad (8)$$

where $\vec{x}_0$ is the position to the lower corner of the cube and (dx,dy,dz) are the increments between the cube positions in x-, y- and z direction respectively. In order to find values of $P_{Obs}(\vec{x})$ in stacking stick #j, interpolation (linear or higher order) is used to find $P_{Obs}[\vec{x}_j(\xi_j)]$.

Assume that $\vec{x}$ in equation 6 is located on a particular stacking stick (#j) with spatial position. $\vec{x}_j(\xi_j)$. For simplicity we express the observed trace in stacking stick #j by $$P_{Obs}(\xi_j)=P_{Obs}[x_j(\xi_j)] \qquad (9)$$

The same simplification may be used in the expression for the Kirchhoff traveltime from shot→$\vec{x}$→receiver when $\vec{x}$ is located on a stacking stick, i.e. that $\vec{x}=\vec{x}_j(\xi_j)$.

$$t_n(\xi_j)=t_n[x_j(\xi_j)] \qquad (10)$$

Then we introduce $t'_n(\xi_j)$, an approximation to the Kirchhoff traveltime $t_n(\xi_j)$ in equation 6. The approximation $t'_n(\xi_j)$ use so called paraxial extrapolation [8] of the travel time values around the reflection point $\vec{R}$ (see FIG. 3) for ray path #n from shot via $x_j(\xi_j)$ on the stacking stick #j to the receiver. Paraxial extrapolation means that $$t'_n(\xi_j) \approx t_n(\xi_j) \qquad (11)$$

for stacking sticks in the neighborhood of $\vec{R}$. By using this approximation, $g_n[t_n(\xi_j)]$ from equation 3 and equation 6 can be reformulated to $$g_n[t'_n(\xi_j)]=Re\{R_n(\phi_n)Q_n\}s(t'_n(\xi_j)-\tau_n)-Im\{R_n(\phi_n)Q_n\}h(t'_n(\xi_j)-\tau_n) \qquad (12)$$

Since the reflection angle, $\phi_n$, is included in equation 12, we can introduce the angle dependency in $P_{Obs}(\xi_j)$ and write equation 6 as $$P_{Obs}(\xi_j,\bar{\varphi}_j) = \sum_{n=1}^{N} \{Re\{R_n(\varphi_n)Q_n\}s(t'_n(\xi_j)-\tau_n) - Im\{R_n(\varphi_n)Q_n\}h(t'_n(\xi_j)-\tau_n)\} \qquad (13)$$

where $\bar{\varphi}_j$ is a weighted mean of the N reflection angles $\phi_n$ in equation 13. A closer definition of this angle will be presented later.

Furthermore, we assume a real RC, $R_n(\phi_n)$, as in e.g. PP reflection at sub-critical angle. We use this assumption in equation 13 to get $$P_{Obs}(\xi_j,\bar{\varphi}_j) = \sum_{n=1}^{N} R_n(\varphi_n)P_n(\xi_j) \qquad (14)$$

where $$P_n(\xi_j)=Re\{Q_n\}s(t'_n(\xi_j)-\tau_n)-Im\{Q_n\}h(t'_n(\xi_j)-\tau_n \qquad (15)$$

Then we introduce a mean RC, $\tilde{R}(\xi_j,\phi_n)$ $$P_{Obs}(\xi_j,\bar{\varphi}_j) = \tilde{R}(\xi_j,\bar{\varphi}_n)\sum_{n=1}^{N} P_n(\xi_j) \qquad (16)$$

where $\tilde{R}(\xi_j,\phi_n)$ may be found by combining equation 14 with equation 16:

$$\tilde{R}(\xi_j,\bar{\varphi}_n) = \sum_{n=1}^{N} w_n(\xi_j)R_n(\varphi_n) \qquad (17)$$

with weights, $w_n(\xi_j)$, given by $$w_n(\xi_j) = \frac{P_n(\xi_j)}{\sum_{i=1}^{N} P_i(\xi_j)} \qquad (18)$$

Expression for PSDM of Seismics from Ray Modeling

Above we found a ray tracing based approximation to PSDM of the observed (or measured) seismics, as presented in equation 16 for a band of width $L_\xi$ along the target reflector. We will now find the corresponding expression for ray modeled traces in stacking stick #j in a model where target reflector with a RC set to 1.0 for all points and all angles, but with a shape identical to the target reflector in the real model. By the same reasoning as for the deduction of equation 6 we get:

$$P_{Mod}(\xi_j) = \sum_{n=1}^{N} \dot{g}'_n[t'_n(\xi_j)] \qquad (19)$$

where $t'_n(\xi_j)$ is the Kirchhoff traveltime approximated by paraxial extrapolation [8] in the neighborhood of $\vec{R}$ (see FIG. 3) for ray path #n from shot, via $\vec{x}_j(\xi_j)$ on stacking stick #j to receiver, $\dot{g}'_n[t'_n(\xi_j)]$ is the time derivative of the n'th ray modeled trace $g_n[t'_n(\xi_j)]$ obtained by setting $R_k=1.0$ in equation 3:

$$g'_n[t'_n(\xi_j)]=Re\{Q_k\}s(t'_n-\tau_k)-Im\{Q_k\}h(t'_n-\tau_k) \qquad (20)$$

By comparing equation 20 with equation 15 we see that $$\dot{g}'_n[t'_n(\xi_j)]=P_n(\xi_j) \qquad (21)$$

which is inserted into equation 19 to get $$P_{Mod}(\xi_j) = \sum_{n=1}^{N} P_n(\xi_j) \qquad (22)$$

Equation 22 is the expression for the ray-modeled result of unweighted PSDM in a model where RC is 1.0 along target reflector. The number of rays, N, is the subset of all rays between all shot/receiver pairs with the property $$\tau_n < t_n(\xi_j) < \tau_n + T \tag{23}$$

for at least one of the points $\vec{x}_j(\xi_j)$ on stacking stick #j.

Estimation of Reflection Coefficient (RC), Square Method

Based on equation 16 and equation 17 it can be shown that the following equation that involves square values of $P_{Obs}(\xi_j,\phi_j)$ and $P_{Mod}(\xi_j)$ is an estimate of the square of the angle dependent RC in the intersection between stacking stick #j and the target reflector, $$[R_E(\xi_j = 0, \tilde{\varphi}_j)]^2 = \frac{\int_{\xi_{jA}}^{\xi_{jB}} \{P_{Obs}(\xi_j, \tilde{\varphi}_j)F(\xi_j)\}^2 d\xi_j}{\int_{\xi_{jA}}^{\xi_{jB}} \{P_{Mod}(\xi_j)F(\xi_j)\}^2 d\xi_j} \tag{24}$$

where $\Re_E(\xi_j=0,\tilde{\phi}_j)$ is the estimate of the RC for the intersection point between stacking stick #j and the target reflector for reflection angle $\phi_j$, $P_{Obs}(\xi_j,\phi_j)$ is the observed, real PSDM trace in stacking stick #j, $P_{Mod}(\xi_j)$ is the ray modeled PSDM trace in stacking stick #j, $F(\xi_j)$ is a weight function along stacking stick #j and $(\xi_{j1},\xi_{jk})$ are the minimal and maximal value of $\xi_j$ along stacking stick #j.

The discrete version of equation 24 is as follows.

$$[R_E(\xi_j = 0, \tilde{\varphi}_j)]^2 = \frac{E_{Obs}}{E_{Mod}} \tag{25}$$

where $$E_{Mod} = \sum_{k=1}^{K} \{P_{Mod}(\xi_{jk})F(\xi_{jk})\}^2 \Delta\xi \tag{26}$$

and $$E_{Obs} = \sum_{k=1}^{K} \{P_{Obs}(\xi_{jk}, \tilde{\varphi}_j)F(\xi_{jk})\}^2 \Delta\xi \tag{27}$$

where $\xi_{jk}$ is a discrete value of $\xi_j$ with a corresponding position $\vec{x}_j(\xi_{jk})$ on stacking stick #j, and $\Delta\xi$ is the constant increment between the discrete positions $\{\vec{x}_j(\xi_{jk}), \vec{x}_j(\xi_{j(k+1)}), \vec{x}_j(\xi_{j(k+2)}) \ldots\}$ along stacking stick #j.

Inserting equation 22 into equation 26 and equation 16 into equation 27, it is also possible to derive a weight function for the contribution from the individual RC's in the neighborhood of stacking stick #j. The squared estimate of the RC may be expressed as $$[R_E(\xi_j = 0, \tilde{\varphi}_j)]^2 = \sum_{n=1}^{N} \tilde{W}_n(\xi_j, \tilde{\varphi}_j)R_n(\varphi_n) \tag{28}$$

where the weight, $\tilde{W}_n(\xi_j,\phi_j)$, on the RC, $R_n(\phi_n)$, in the reflection point $\vec{R}$ of ray #n is given by $$\tilde{W}_n(\xi_j, \tilde{\varphi}_j) = \frac{\Delta\xi}{E_{Mod}} \sum_{k=1}^{K} F(\xi_{jk})^2 P_{Obs}(\xi_{jk}, \tilde{\varphi}_j) P_n(\xi_{jk}) \tag{29}$$

$E_{Mod}$ is given by equation 26 and the depth migrated pulse $P_n(\xi_{jk})$ is found by ray modeling and equation 15. $P_n(\xi_{jk})$ is found from a ray with reflection angle $\phi_n$ as shown in FIG. 3.

Estimation of Reflection Coefficient (RC), Norm Method

Based on equation 16 and equation 17 it can be shown that the following equation that involves absolute values of $P_{Obs}(\xi_j,\phi_j)$ and $P_{Mod}(\xi_j)$ is an estimate of the absolute value of the angle dependent RC in the intersection between stacking stick #j and the target reflector, $$|R_N(\xi_j = 0, \tilde{\varphi}_j)| = \frac{\int_{\xi_{jA}}^{\xi_{jB}} |P_{Obs}(\xi_j, \tilde{\varphi}_j)F(\xi_j)| d\xi_j}{\int_{\xi_{jA}}^{\xi_{jB}} |P_{Mod}(\xi_j)F(\xi_j)| d\xi_j} \tag{30}$$

where $\Re_N(\xi_j=0,\tilde{\phi}_j)$ is the estimate of the RC for the intersection point between stacking stick #j and the target reflector for reflection angle $\phi_j$, $P_{Obs}(\xi_j,\phi_j)$ is the observed, real PSDM trace in stacking stick #j, $P_{Mod}(\xi_j)$ is the ray modeled PSDM trace in stacking stick #j, $F(\xi_j)$ is a weight function along stacking stick #j and $(\xi_{j1},\xi_{jk})$ are the minimal and maximal values of $\xi_j$ along stacking stick #j.

The discrete version of equation 30 is as follows:

$$|R_N(\xi_j = 0, \tilde{\varphi}_j)| = \frac{N_{Obs}}{N_{Mod}} \tag{31}$$

where $$N_{Mod} = \sum_{k=1}^{K} |P_{Mod}(\xi_{jk})F(\xi_{jk})| \Delta\xi \tag{32}$$

and $$N_{Obs} = \sum_{k=1}^{K} |P_{Obs}(\xi_{jk}, \tilde{\varphi}_j)F(\xi_{jk})| \Delta\xi \tag{33}$$

where $\xi_{jk}$ is a discrete value of $\xi_j$ with a corresponding position $\vec{x}_j(\xi_{jk})$ on stacking stick #j, and $\Delta\xi$ is the increment between the discrete positions $\{\vec{x}_j(\xi_{jk}), \vec{x}_j(\xi_{j(k+1)}), \vec{x}_j(\xi_{j(k+2)}) \ldots\}$ along stacking stick #j.

Inserting equation 22 into equation 32 and equation 16 into equation 33, it is also possible to derive a weight function for the contribution from the individual RC's in the neighborhood of stacking stick #j. The absolute value of the estimate of the RC may be expressed as $$|R_N(\xi_j = 0, \tilde{\varphi}_j)| = \sum_{n=1}^{N} \tilde{W}_n(\xi_j, \tilde{\varphi}_j) R_n(\varphi_n) \quad (34)$$

where the weight, $\hat{W}_n(\xi_j, \phi_j)$, on the RC, $R_n(\phi_n)$, in the reflection point $\vec{R}$ of ray #n is given by $$\hat{W}_n(\xi_j, \tilde{\varphi}_j) = \frac{\Delta \xi}{N_{Mod}} \sum_{k=1}^{K} |F(\xi_{jk})| sgn\{P_{Obs}(\xi_{jk}, \tilde{\varphi}_j)\} P_n(\xi_{jk}) \quad (35)$$

$N_{Mod}$ is given by equation 32 and the depth migrated pulse $P_n(\xi_{jk})$ is found by ray modeling and equation 15. $P_n(\xi_{jk})$ is found from a ray with reflection angle $\phi_n$ as shown in FIG. 3.

Weights and Reflection Angles

Two methods within ROAR have been used to estimate the angle dependant RC for a target reflector. The two methods are "square method" (equation 25)

$$([R_N(\xi_j = 0, \tilde{\varphi}_j)])^2 = \frac{E_{Obs}}{E_{Mod}} \quad (36)$$

and "norm method" (equation 31))

$$|R_N(\xi_j = 0, \tilde{\varphi}_j)| = \frac{N_{Obs}}{N_{Mod}} \quad (37)$$

It is shown above in equation 28 and 34, that the estimated RC's $[\Re_E(\xi_j=0,\tilde{\varphi}_j)]^2$ and $|\Re_N(\xi_j=0,\tilde{\varphi}_j)|$ may be expressed as weighted means of the RC's in the N reflection points in the neighborhood of stacking stick #j.

The weighted mean for the estimation of the RC in stacking stick #j using the square method is according to equation 28

$$([R_E(\xi_j = 0, \tilde{\varphi}_j)])^2 = \sum_{n=1}^{K} \hat{W}_n(\xi_j, \tilde{\varphi}_j) R_n(\varphi_n) \quad (38)$$

and correspondingly for the norm method (equation 34)

$$|R_N(\xi_j = 0, \tilde{\varphi}_j)| = \sum_{n=1}^{K} \hat{W}_n(\xi_j, \tilde{\varphi}_j) R_n(\varphi_n) \quad (39)$$

The equations for the weights in each of these methods are given in equation 29 and 35 respectively. Each of the N contributions in equation 38 and 39 corresponds to a particular ray with reflection point $\vec{R}$ and a reflection coefficient (RC) equal to $R_n(\phi_n)$ in the neighborhood of stacking stick #j. All the RC's in the neighborhood of stacking stick #j contributes to $\Re$, the estimate of the RC. This means that weights in equation 38 and 39 gives the resolution in the estimate of the RC.

We now assume that the target reflector is parameterized by a triangular network as shown in FIG. 4. In each node in the network a there is a stacking stick. It is assumed that the real RC is constant in each of the P triangles that make up the network. The constant value of the RC in each of the P triangles is $R_1^T, R_2^T, R_3^T, \ldots, R_P^T$. To each of the RC's it is associated a reflection angle $\phi_1^T, \phi_2^T, \phi_3^T, \ldots, \phi_P^T$ which will be defined below.

Then equation 38 and 39 is expressed in the general form $$b = \sum_{n=1}^{K} a_n R_n(\varphi_n) \quad (40)$$

where $b=[\Re_E(\xi_j=0,\tilde{\varphi}_j)]^2$; $a_n=\tilde{W}_n(\xi_j,\phi_j)$
  for the Square method, and
$b=|\Re_N(\xi_j=0,\phi_j)|$; $a_n=\hat{W}_n(\xi_j,\phi_j)$
  for the Norm method Each of the discrete values $R_n(\phi_n)$ of the RC in equation 40 corresponds to a reflection point in FIG. 4.

Next we define to subsets:

$S_p$: the subset of the N reflection points in equation 40 located in triangle #p.
$S^T$: the subset of all the P triangles in target horizon that contains at least one of the N reflection points in equation 40.

Using this, the relation between $R_n(\phi_n)$ and $R_p^T$ may be expressed as $$R_n(\phi_n) = R_p^T \quad (41)$$

for all $R_n(\phi_n)$ with reflection points in the subset $S_p$, that is for all $n \in S_p$.

The reflection angle $\phi_p^T$ associated to $R_p^T$ is defined as $$\varphi_p^T = \frac{\sum_{n \in S_p} \varphi_n}{\text{\# elements in } S_p} \quad (42)$$

By using equation 41 in equation 40, the latter equation may be expressed as $$b = \sum_{p \in S^T} A_p' R_p^T \quad (43)$$

where $$A_p' = \sum_{n \in S_p} a_n \quad (44)$$

In order to find a weight function that gives the weight "per unit area" of the target reflector we consider a continuous weight function $A(\vec{X}_s)$ with this property. Such a weight function would have to be integrated over the target reflector with a continuous RC function $R^T(\vec{x}_s)$ in the following way.

$$b = \int_S A(\vec{x}_s) R^T(\vec{x}_s) dS \quad \text{where } S \text{ is Target Reflector} \quad (45)$$

This equation may be parameterized in the following way using the triangular parameterization of the target reflector described above and shown in FIG. 4.

$$b = \sum_{p \in S^T} A_p R_p^T \Delta T_p \quad (46)$$

In this equation, $\Delta T_p$ is the area of triangle #p while $A_p$ and $R_p^T$ are the weight and RC respectively, associated to triangle #p.

By comparing equation 46 with equation 43, we see that the discrete approximation to a "per unit area" weight function is $$A_p = \frac{A'_p}{\Delta T_p} = \frac{\sum_{n \in S_p} a_n}{\Delta T_p} \quad (47)$$

giving the weight per unit area for the RC in triangle #p in the subset $S^T$.

The reflection angle $\phi_j$ associated to the estimate of b (i.e. the estimation of the RC as shown in equation 40) is found by a weighted mean of the angles $\phi_p{}^T$ from equation 42

$$\tilde{\varphi}_j = \sum_{p \in S^T} W_p^T \varphi_p^T \quad (48)$$

with weights $$W_p^T = \frac{|A'_p|}{\sum_{k \in S^T} A'_k} \quad (49)$$

where $A'_p$ is given by equation 44.

EXAMPLE

As an example of the application of the new invention, the simple 2-D (two dimensional) model shown in FIG. 5 is used. The model consists of two layers separated by a target reflector with a syncline of depth 1 km between x=4 km and x=8 km. The lower layer consists of 5 zones with constant seismic velocities and densities in each, as shown in FIG. 5.

The example consists of simulating real seismic data by ray tracing in order to generate a synthetic data set. The data set is used in PSDM to generate a seismic depth section. Then, the new invention, ROAR, is used on the result from PSDM as described above. This makes it possible to check the accuracy of the method by comparing with the true reflection coefficients from the model in FIG. 5.

At the surface of the model in FIG. 5, a marine survey with 138 shot positions and 120 receivers are simulated. In a marine survey, the receivers are towed behind the shots. The distance between the shots are 25 m and the distance between the receivers are 25 m as well. The distance from a shot to the first receiver is 25 m while the distance from the shot to the last receiver (#120) is 3000 m. The distance between shot and receiver is generally termed the offset.

The seismic data from each of these 138 shots are simulated by ray modeling, as described in reference [9] and [10].

The total offset range from 25 m to 3000 m is divided into 10 sub intervals with offset from 25 to 300 m in the first interval, 325 to 600 m in the second interval etc. In FIG. 6, the result of PSDM of the synthetic data for the first offset interval is shown. The shape of the target reflector is clearly visible. In FIG. 7, the measured maximum amplitude along target reflector in the depth section in FIG. 6 is shown along with the true reflection coefficient for reflection angle equal to zero. The figure shows a poor correspondence between amplitudes from PSDM and the true reflection coefficient.

Using ROAR, the angle dependent reflection coefficient is approximated with a large degree of accuracy, as shown in FIG. 8. In this figure, the true reflection coefficient is plotted as solid lines and the estimates from ROAR with black dots.

The upper of the solid curves corresponds to the reflection coefficient in the position x=5 km, while the lower one corresponds to the position x=3 km.

In FIG. 9, the estimated reflection coefficient for the lowermost offset interval (25 m to 300 m) is shown as black points along with the true reflection coefficient shown as a continuous curve. Notice that the estimated reflection coefficient is smoother than true reflection coefficient. This is caused by the limited resolution of the details in the RC by the ROAR method. A part of ROAR consists in a quantitative calculation of this resolution for all points along the target reflector by the weight functions. Two of the weight functions, $W_1$ ad $W_2$ for two positions on the target reflector are shown at the top of FIG. 9. The weight functions show that the resolution is better in point C than in point D indicated in the figure.

The present invention is not restricted to that described above and shown in the drawings, but can also be modified and changed in a number of ways within the scope of the concept of the invention as stated in the following claims. For example, it can be considered using other methods for measuring the amplitudes or energy in the seismic cubes. One can also use other modeling methods than ray tracing for computing the synthetic traces.

List of References

[1] Gray, S. H., 1997, True-amplitude seismic migration: A comparison of three approaches. *Geophysics,* 62, 929–936

[2] Beylkin, G., 1985, Imaging of discontinuities in the inverse scattering problem by inversion of a causal generalized Radon Transform: *J. Math. Phys.,* 26, 99–108

[3] Berkhout, A. J., 1985, Seismic migration: Imaging of acoustic energy by wavefield extrapolation A. Theoretical aspects, Elsevier Science Publ.

[4] Berkhout, A. J., and Wapenaar, C. P. A., 1993, A unified approach to acoustical reflection imaging. Part II: The inverse problem: *J. Acoust. Soc. Am.,* 93, 2017–2023

[5] Hanitzsch, C., Schleicher, J., and Hubral, P., 1994, True-amplitude migration of 2-D synthetic data: *Geophys. Prosp,.* 42, 445–462

[6] Bleistein, N., 1987, On the imaging of reflectors in the earth. *Geophysics,* 52, 931–942

[7] Hanitzsch, C., 1995, Amplitude preserving prestack Kirchhoff depth migration/inversion in laterally inhomogeneous media: *Ph.D. dissertation,* University of Karlsruhe.

[8] Cerveny, V., 1985, The application of ray tracing to the numerical modeling of seismic wavefields in complex structures: *Handbook of Geophys. Expl.,* 15A, 1–124, Geophysical Press.

[9] Vinje, V., Iversen, E., and Gjoystdal, H., 1993, Traveltime and amplitude estimation using wavefront construction: *Geophysics,* VOL. 58, NO. 8; P.1157–1166

[10] Vinje, V., Iversen, E., Aastebol, K., and Gjoystdal, H., 1996, Estimation of multivalued arrivals in 3D models using wavefront construction, Part I & II: *Geophysical Prospecting,* 44, P.819–858

[11] Aki, K. and Richards, P. G., 1980, Quantitative Seismoligy, Theory and Methods. Volume I, Chapter 5, *ISBN* 0-7167-1058-7 (v.1)

[12] Geoltrain, S. and Brac, J., 1993, Can we image complex structures with first-arrival traveltimes? *Geophysics,* 58, 564–575

[13] Vidale, J. E., 1988, Finite-difference calculation of traveltimes: *Bull. Seis. Soc. Am.,* 78, no. 6, 2062–2076

[14] Podvin, P., and Lecomte, I., 1991, Finite-difference computation of traveltimes in very contrasted velocity models: A massively parallel approach and its associated tools: *Geophys. J. Int.,* 105, 271–284

What is claimed is:

1. A method for finding the Reflection Coefficient (RC) of reflectors in illuminated areas of the subsurface of the ground, comprising:
   a) migrating to depth recorded traces in a survey by Pre-Stack Depth Migration (PSDM), using shot/receiver pairs, to obtain a real depth migrated seismic cube $P_{Obs}(\vec{x})$ which is a function of the recorded traces that have each been given a weight $w_i(\vec{x})$;
   b) interpreting $P_{Obs}(\vec{x})$ to find the spatial positions of the reflectors in the subsurface, and based on these reflectors and the seismic velocities, a depth model is established in the computer, wherein one of the reflector surfaces in the depth model is chosen to be the target reflector;
   c) computing synthetic traces from the target reflector for all shot/receiver pairs by setting the RC of the target reflector in the depth model to an essentially constant value when the synthetic traces are computed;
   d) performing a local PSDM of the computed synthetic traces in a band around the target reflector to obtain a modeled synthetic PSDM cube $P_{Mod}(\vec{x})$ locally around the target reflector; and
   e) measuring the amplitudes along the target reflector from the real PSDM cube $P_{Obs}(\vec{x})$, and dividing these amplitude measurements by the corresponding amplitude measurements from the modeled PSDM cube $P_{Mod}(\vec{x})$, to thereby obtain discrete estimates of the angle dependent RC for all illuminated areas of the target reflector and a weight function for all discrete estimates of the RC along the target reflector.

2. An article of manufacture comprising:
   a computer usable medium having computer readable program code embodied therein for finding the Reflection Coefficient (RC) of reflectors in illuminated areas of the subsurface, the computer readable program code in said article of manufacture comprising:
   a) computer program means for enabling a computer to determine depth recorded traces in a survey by Pre-Stack Depth Migration (PSDM), using shot/receiver pairs, to obtain a real depth migrated seismic cube which is a function of the recorded traces that have each been given a weight $w_i(\vec{x})$;
   b) said computer program means including means for enabling a computer to interpret $P_{Obs}(\vec{x})$ to find the spatial positions of the reflectors in the subsurface, and based on these reflectors and the seismic velocities a depth model is established in the computer, wherein one of the reflector surfaces in the depth model is chosen to be the target reflector;
   c) said computer program means including means for enabling a computer to compute synthetic traces from the target reflector from all shot/receiver pairs by programming the computer to set the RC of the target reflector in the depth model to an essentially constant value when the synthetic traces are computed;
   d) said computer program means including means for enabling a computer to perform a local PSDM of the computed synthetic traces in a band around the target reflector to obtain a modeled synthetic PSDM cube $P_{Mod}(\vec{x})$ locally around the target reflector; and
   e) said computer program means including means for enabling a computer to measure the amplitudes along the target reflector from the real PSDM cube $P_{Obs}(\vec{x})$, and dividing these amplitude measurements by the corresponding amplitude measurements from the modeled PSDM cube $P_{Mod}(\vec{x})$, to thereby obtain discrete estimates of the angle dependent RC for all illuminated areas of the target reflector and a weight function for all discrete estimates of the RC along the target reflector.

3. The method according to claim 1, wherein the RC in c) is set to 1.0 in the calculation of the synthetic traces.

4. The method according to claim 1, wherein the same weights $w_i(\vec{x})$ in the PSDM in a) are used in the local PSDM in d).

5. The method according to claim 1, wherein "square" method or "norm" method is used for measuring the amplitudes in e).

6. The method according to claim 1, wherein steps a) to e) are repeated for points along the target reflector to create a map of the RC with corresponding angles.

7. The method according to claim 1, wherein the synthetic traces in c) are computed by ray tracing.

8. The computer program according to claim 2, wherein the RC in c) is set to 1.0 in the calculation of the synthetic traces.

9. The computer program, according to claim 2, wherein the weights $w_i(\vec{x})$ in the PSDM in a) are used in the local PSDM in d).

10. The computer program according to claim 2, wherein the "square" method or "norm" method is used for measuring the amplitudes in e).

11. The computer program according to claim 2, wherein the program means in a) to e) is repeated for points along the target reflector to make a map of the RC for the target reflector.

12. The computer program according to claim 2, wherein the synthetic traces in c) are computed by ray tracing.

13. A data set representing the Reflection Coefficient (RC) of illuminated areas of subsurface reflectors produced by
    a) migrating to depth recorded traces in a survey by Pre-Stack Depth Migration (PSDM), using shot/receiver pairs, to obtain a real depth migrated seismic cube $P_{Obs}(\vec{x})$ which is a function of the recorded traces that have each been given a weight $w_i(\vec{x})$;
    b) interpreting $P_{Obs}(\vec{x})$ to find the spatial positions of the reflectors in the subsurface, and based on these reflectors and the seismic velocities, a depth model is established in the computer, wherein one of the reflector surfaces in the depth model is chosen to be the target reflector;
    c) computing synthetic traces from the target reflector for all shot/receiver pairs by setting the RC of the target reflector in the depth model to an essentially constant value when the synthetic traces are computed;
    d) performing a local PSDM of the computed synthetic traces in a band around the target reflector to obtain a modeled synthetic PSDM cube $P_{Mod}(\vec{x})$ locally around the target reflector; and
    e) measuring the amplitudes along the target reflector from the real PSDM cube $P_{Obs}(\vec{x})$, and dividing these amplitude measurements by the corresponding amplitude measurements from the modeled PSDM cube $P_{Mod}(\vec{x})$, to obtain discrete estimates of the angle dependent RC for all illuminated areas of the target reflector and a weight function for all discrete estimates of the RC along the target reflector.

14. The data set according to claim 13, wherein the RC in c) is set to 1.0 in the calculation of the synthetic traces.

15. The data set according to claim 13, wherein the same weights $w_t(\vec{x})$ in the PSDM in a) are used in the local PSDM in d).

16. The data set according to claim 13, wherein "square" method or "norm" method is used for measuring the amplitudes in e).

17. The data set according to claim 13, wherein steps a) to e) are repeated for points along the target reflector to create a map of the RC with corresponding angles.

18. The data set according to claim 13, wherein the synthetic traces in c) are computed by ray tracing.

19. A map produced by multidimensional plotting of the data set according to claim 13.

* * * * *